United States Patent [19]

Roy et al.

[11] Patent Number: 5,294,169
[45] Date of Patent: Mar. 15, 1994

[54] COVER PLATE

[75] Inventors: Dhirendra C. Roy, Canton; Thomas C. Morgan, III, Berkley, both of Mich.

[73] Assignee: United Technologies Automotive, Inc., Dearborn, Mich.

[21] Appl. No.: 100,126

[22] Filed: Jul. 30, 1993

[51] Int. Cl.$^5$ .............................................. B62D 25/00
[52] U.S. Cl. ........................... 296/146.5; 296/1.1; 220/3.5
[58] Field of Search .............. 296/146 R, 146 B, 191, 296/208, 194, 192, 1.1; 220/3.3, 3.5, 3.8

[56] References Cited

U.S. PATENT DOCUMENTS

| | | | |
|---|---|---|---|
| 3,278,066 | 10/1966 | George et al. | 220/24.3 |
| 3,438,536 | 4/1969 | Tarchalski | 220/27 |
| 3,490,637 | 1/1970 | Pope | 220/3.4 |
| 3,899,101 | 8/1975 | Keating et al. | 220/241 |
| 3,900,130 | 8/1975 | Andrews | 220/378 |
| 4,534,487 | 8/1985 | Rapata | 220/305 |
| 4,560,083 | 12/1985 | Danico | 220/307 |
| 4,666,055 | 5/1987 | Lewis | 220/3.5 |
| 4,800,638 | 1/1989 | Herringshaw et al. | 296/146.5 R |
| 4,998,635 | 3/1991 | Vink et al. | 220/3.3 |
| 5,069,357 | 12/1991 | Anderson | 220/307 |
| 5,211,580 | 5/1993 | Schupin | 220/3.5 X |

Primary Examiner—Robert R. Song
Attorney, Agent, or Firm—Harness, Dickey & Pierce

[57] ABSTRACT

A cover plate for use in covering an opening in an automotive vehicle body panel is comprised of a substantially flat base having an appearance face and a hidden face bordered by a peripheral edge. The peripheral edge has a tapered frame around a majority thereof. The cover plate is further comprised of a pair of flexible legs each having a shortened member projecting from the hidden face and having an elongated member extending beyond the peripheral edge of the base partially coincidental to an overhanging portion of the base. The cover plate also has a wedge ramp with a triangular-shaped segment being mounted upon the hidden face of the base such that an intersection is created between a hypotenuse of the wedge ramp and the base. The base has a first portion which is juxtaposed to this intersection. A fastening protrudes from the hidden face of this first portion. Accordingly, the cover plate covers the opening of the body panel by engagement of the pair of legs and the overhanging portion of the base around an edge of the body panel surrounding the opening. The cover plate is also attached upon the body panel by insertion of the fastening post within a hole adjacent to the opening such that an auxiliary fastener can be secured upon the inserted fastening post. Moreover, the wedge ramp serves to locate the cover plate into a desired relationship with the opening to ensure proper engagement thereagainst.

8 Claims, 2 Drawing Sheets

COVER PLATE

BACKGROUND OF THE INVENTION

This invention relates generally to cover plates and specifically to cover plates for use in covering an opening in an automotive vehicle body panel.

In many automotive vehicle body panels it is common to have various openings for allowing access to fasteners, for passing through electrical wire harnesses, for passing through sunroof drain tubes, for welding gun access, or for passing through connecting rods. Such body panels often consist of passenger doors, the rear seat back panel, the engine compartment fire wall or the toe pan. While such openings are often necessary, they nevertheless cause acoustical noise problems, water entry, dust entry and undesirable air flow into the passenger or trunk compartments.

A variety of plugs have been used to cover these automotive vehicle body panel openings. One such conventional device uses an elastomeric coated ferrous material which has a pair of threaded studs butt welded thereagainst. This coated member is installed against the body panel so as to cover the opening and have the threaded studs protruding through adjacent holes. Nuts are then driven onto these studs from an opposing side of the body panel. However, this cover can be costly to manufacture and difficult to install on a quickly moving assembly line. Another device commonly used to cover access holes is a pressure sensitive adhesive coated die-cut patch of flat elastomeric material. This patch is merely compressed against the body panel over the opening. While such a construction is cost effective, its sealing quality and adhesive durability are often lacking. Furthermore, this adhesive coated patch is very operator sensitive and does not effectively seal around pass through devices. A variety of other traditional closures are disclosed in the following U.S. Pat. Nos. 4,560,083 entitled "Closure and Method for an Aperture," which issued to Danico on Dec. 24, 1985; 3,900,130 entitled "Insert for Securing in a Hole," which issued to Andrews on Aug. 19, 1975; 3,438,536 entitled "Removable Covers," which issued to Tarchalski on Apr. 15, 1969; and, 3,278,066 entitled "Closure Plate for Electrical Panelboard," which issued to George et al. on Oct. 11, 1966. These closures typically have a variety of clips or flanges extending along the edges thereof.

Therefore, it is desirable to have a cover plate which is cost effective to manufacture, provides a high quality seal, can be firmly secured to an automotive vehicle body panel and can optionally provide a sealed pass through for electrical wire harnesses or the like.

SUMMARY OF THE INVENTION

In accordance with the present invention, a preferred embodiment of a new and useful cover plate for use in covering an opening in an automotive vehicle body panel is generally comprised of a substantially flat base having an appearance face and a hidden face bordered by a peripheral edge. The peripheral edge has a tapered frame around a majority thereof. The cover plate is further comprised of a pair of flexible legs each having a shortened member projecting from the hidden face and having an elongated member extending beyond the peripheral edge of the base partially coincidental to an overhanging portion of the base. The cover plate also has a wedge ramp with a triangular-shaped segment being mounted upon the hidden face of the base such that an intersection is created between a hypotenuse of the wedge ramp and the base. The base has a first portion which is juxtaposed to this intersection. A fastening post protrudes from the hidden face of this first portion.

Accordingly, the cover plate serves to cover the opening of the body panel by engagement of the pair of legs and the overhanging portion of the base around an edge of the body panel surrounding the opening. The cover plate is also attached upon the body panel by insertion of the fastening post within a hole adjacent to the opening such that an auxiliary fastener can be secured upon the inserted fastening post. Moreover, the wedge ramp serves to locate the cover plate into a desired relationship with the opening to ensure proper engagement thereagainst. In another aspect of the present invention, the cover plate provides a preloaded interference against the vehicle body panel through angling of the tapered frame outward from the hidden face and thus creates a seal against the body panel. In a further aspect of the present invention, a circular aperture is formed within the base and a cylindrical boss extends around the aperture and protrudes from the hidden face. This provides a sealable pass through for electrical wire harnesses, sunroof drain tubes, connecting rods or the like. A grommet, attached to such a pass through device, engagably interfaces with the aperture and the boss of the base to provide such a pass through seal.

The cover plate of the present invention is advantageous over the prior art in that it can be a cost effective product, easy to install, securely sealed, firmly attached and allows for sealing against a pass through device. Additionally, the cover plate of the present invention is self-centering and self-positioning while being installed. Additional advantages and features of the present invention will become apparent from the following description and appended claims, taken in conjunction with the accompanying drawings.

DETAILED DESCRIPTION OF THE PREFERRED EMBODIMENTS

Figure 1:
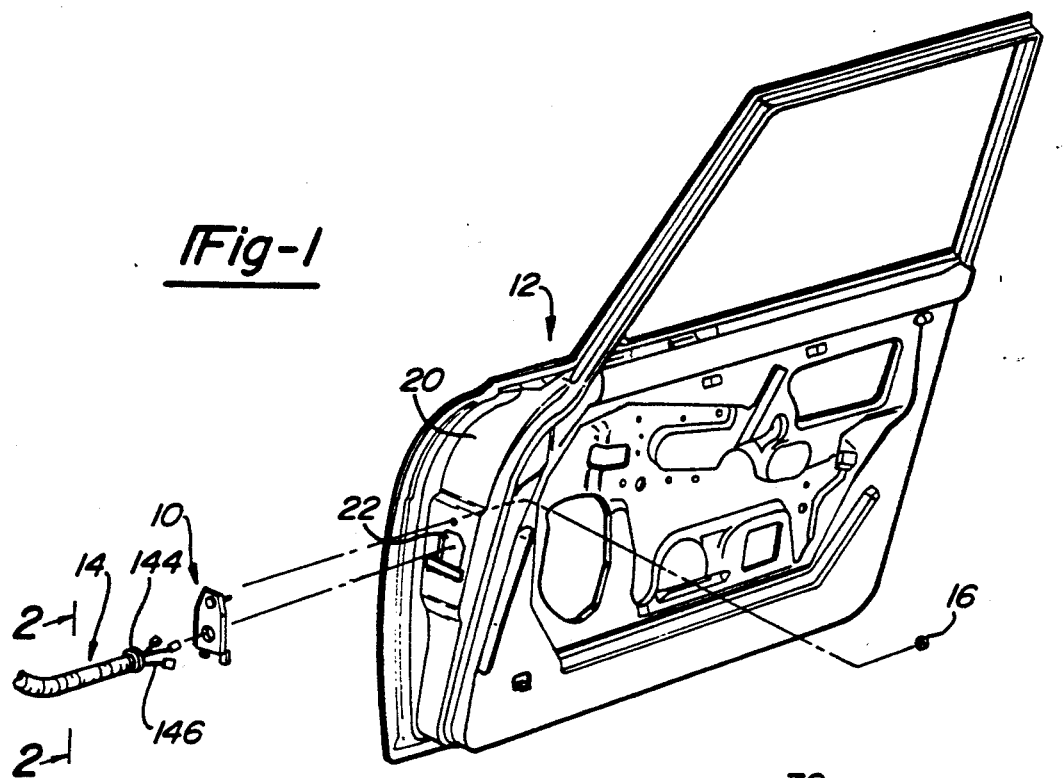
FIG. 1 is an exploded perspective view of a first preferred embodiment of a cover plate of the present invention in relation to an electrical wire harness, grommet, automotive vehicle door panel and nut.
Figure 2:
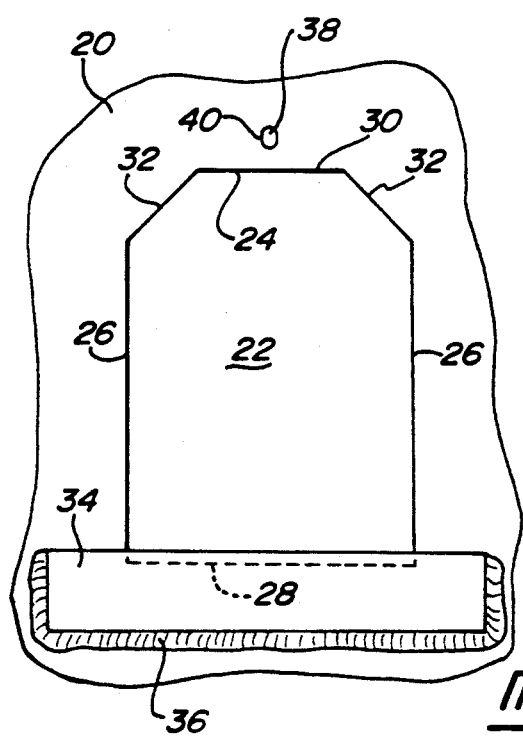
FIG. 2 is a fragmentary front elevational view, taken in the direction of line 2—2, of the door panel within which the present invention cover plate of FIG. 1 is used.

Referring to FIGS. 1 and 2, a first preferred embodiment of a cover plate 10 is shown in relation to an automotive vehicle body panel such as a door panel 12, an electrical wire harness assembly 14 and a nut 16. Door panel 12 has a front face 20 stamped from a sheet of steel and has an opening 22 therein defined by a first panel edge 24. Opening 22 is shaped like a six-sided polygon having a pair of elongated edges 26, a bottom edge 28, a top edge 30 and a pair of angled corner edges 32. Front face 20 further has a reinforcement plate 34 which is affixed coincidental with bottom edge 28 by a weld 36. Additionally, a hole or slot 38 is cut within door 12 vertically above top edge 30. Slot 38 is defined by a second panel edge 40 therearound.

Figure 3:
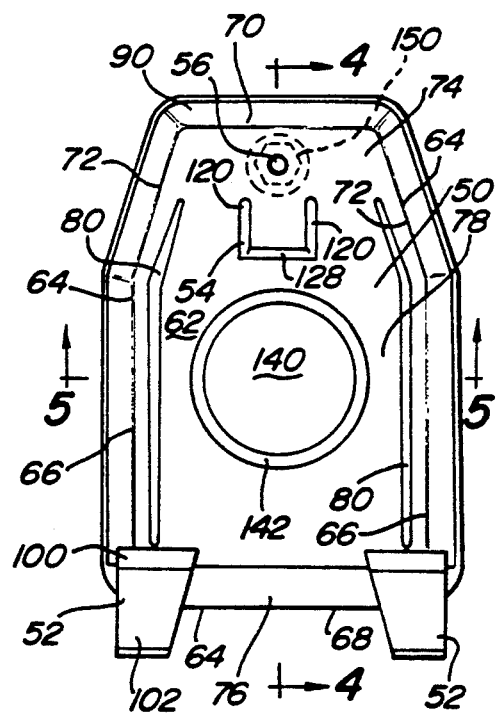
FIG. 3 is a rear elevational view of the present invention cover plate of FIG. 1.
Figure 4:
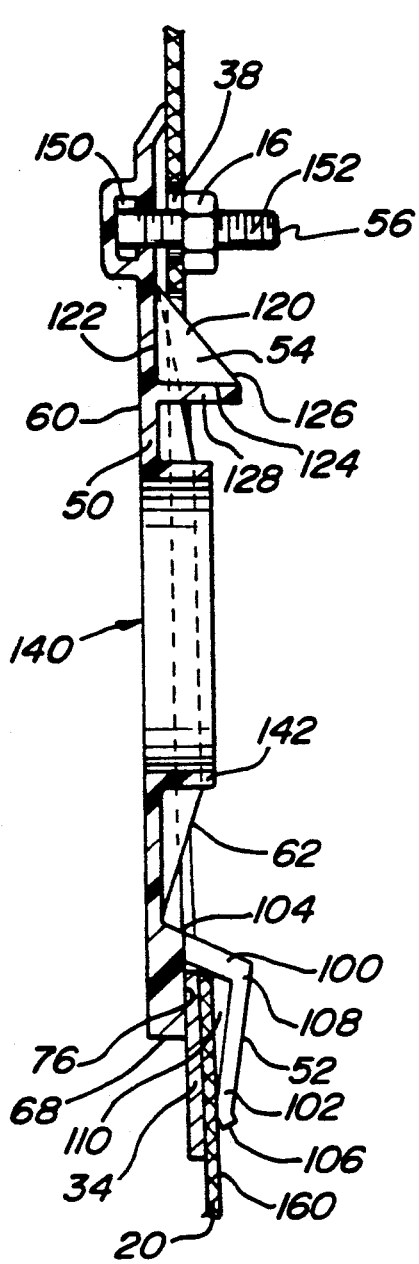
FIG. 4 is a vertical sectional view, taken along line 4—4 of FIG. 3, of the present invention cover plate in relation to the adjacent door panel and nut.
Figure 5:
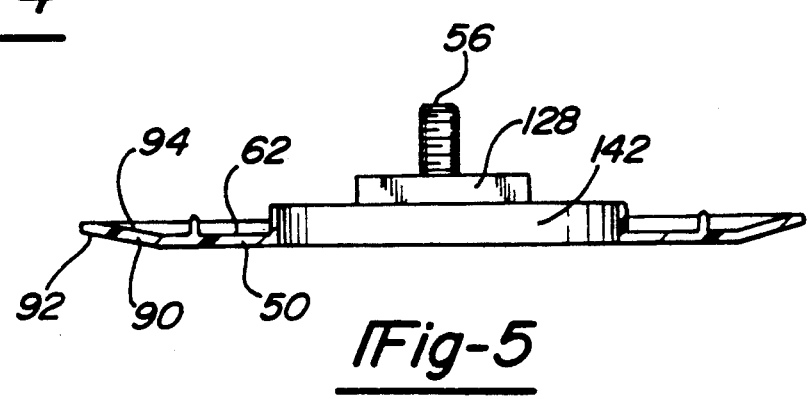
FIG. 5 is a horizontal sectional view, taken along line 5—5 of FIG. 3, of the present invention cover plate.

As can best be seen in FIGS. 3–5, the present invention cover plate is constructed from a base 50, a pair of legs 52, a wedge ramp 54 and a fastening post 56. Base 50 is substantially flat and has an appearance face 60 and a hidden face 62 bordered by a peripheral edge 64. Peripheral edge 64 is defined by a pair of elongated sides 66, a bottom side 68, a top side 70 and a pair of angled corner sides 72. Furthermore, base 50 has an upper portion 74 and a lower thickened overhanging portion 76 which are centrally joined by a median portion 78. Median portion 78 is reinforced by a pair of structural ribs 80 extending from hidden face 62 thereof. Ribs 80 are close to and run parallel to elongated sides 66 and angled corner sides 72. Moreover, a frame 90 integrally extends from peripheral edge 64 proximate with elongated sides 66, angled corner sides 72 and top side 70. Frame 90 has a tapered appearance surface 92 and an angled surface 94 which is angled outward from hidden face 62 of base 50.

Legs 52 have a substantially L-shaped configuration being defined by a shortened member 100 and a elongated member 102. Shortened member 100 has a distal end 104 which is integrally molded to hidden face 62 of base 50. Elongated member 102 also has a distal end 106 which is bent so as to provide a lead-in angle. Elongated member 102 of leg 52 is angled from an intersection 108 of elongated member 102 and shortened member 100 toward a plane defined by base 50. Also, a portion of elongated member 102 adjacent to distal end 106 extends past bottom side 68 of peripheral edge 64, and a portion of elongated member 102 adjacent to intersection 108 forms a cavity 110 between overhanging portion 76 of the base 50 and itself. Legs 52 are flexible and resilient.

Wedge ramp 54 is comprised of a pair of triangular-shaped segments 120 each of which have a first side 122, a second side 124 and a hypotenuse 126. Each triangular-shaped segment 120 is integrally mounted upon hidden face 62 of base 50 along first side 122. Furthermore, hypotenuse 126 of each triangular-shaped segment 120 intersects hidden face 62 coincidental with upper portion 74 of base 50. Triangular-shaped segments 120 are attached to one another along second side 124 thereof by a transverse wall 128 which extends substantially normal from hidden face 62.

An optional aperture 140 centrally extends through medial portion 78 of base 50. Aperture 140 is circular in shape and is defined by a cylindrical boss 142 which projects from hidden face 62 around aperture 140. Cover plate 10 is an injection molded part that can be made from a polymeric material. Referring to FIG. 1 an elastomeric grommet 144 can be engagably inserted within aperture 140 to seal against boss 142 (see FIGS. 3 and 4). Accordingly, a plurality of electrical wires 146 can be passed therethrough.

Fastening post 56 is preferably an insert molded screw. Accordingly, fastening post 56 has a head 150 which is proximate with appearance surface 60 of base 50 at top portion 74. Head 150 is encapsulated in plastic material during the molding of cover plate 10. Furthermore, a threaded portion 152 extends through base 50 and protrudes from hidden face 62 in a substantially perpendicular orientation. Head 150 may have a hexagonal or other configuration such that after being insert molded it will maintain its position when threaded portion 152 is torqued.

Cover plate 10 is fastened upon opening 22 of door panel 12 by first engaging bottom edge 28 of first panel edge 24 and reinforcement 34 within cavities 110 between elongated members 102 of legs 52 and overhanging portion 76 of base 50. Legs 52 are biased so as to compress against an inside surface 160 of door panel 12. Meanwhile, top portion 74 of base 50 is rotated toward door panel 12 such that fastening post 56 is inserted through slot 38. Concurrently, wedge ramp 54 serves to correctly position and center cover plate 10 with respect to opening 22 by the interference created between hypotenuses 126 and top edge 30. An auxiliary fastener, such as nut 16 having internal threads therein, is driven upon threaded portion 152 of the inserted fastening post 56. Cover plate 10 provides a continuous interference against door panel 12 and thus creates a preloaded sealing feature around opening 22 by the flattening of angled frame 90 against front face 20 of door panel 12 during torquing of nut 16 upon fastening post 56.

It should be noted that the transverse distance between legs 52, in relation to elongated sides 26 of first panel edge 24, may have a critical dimensional relationship for proper sealing and engagement of cover plate 10 therein. Furthermore, aperture 140 within cover plate 10 is optional and is not required for covering an access hole without a device passing therethrough.

Figure 6:
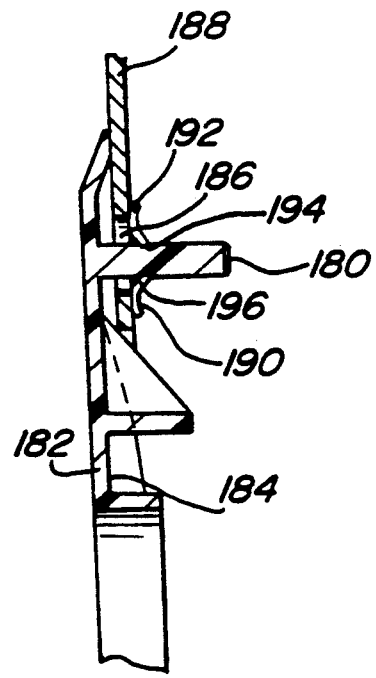
FIG. 6 is a vertical sectional view, similar to that of FIG. 4, of a second preferred embodiment of the cover plate of the present invention in relation to the adjacent door panel and a push nut.

A second preferred embodiment of a fastening post 180 is shown in FIG. 6. A base 182 is substantially similar in construction to that of the first preferred embodiment, however, cylindrically-shaped fastening post 180 is integrally molded from a hidden face 184 thereof. This fastening post 180 extends through a slot 186 within a vehicle body panel 188 and a push nut 190 is engagably locked thereupon. Push nut 190 is of a type known to one skilled in the art and consists of a spring steel body 192 having a central orifice 194 therein bordered by a plurality of barbed elements 196. Alternatively, fastening post 180 can be constructed with a barbed Christmas tree, arrowhead, fish hook or other self-locking formation.

While the preferred embodiments of this cover plate have been disclosed, it will be appreciated that various modifications may be made without departing from the present invention. For example, the wedge ramp may be comprised of a single triangular-shaped segment. Furthermore, the cover plate may also have a plurality of pass through apertures extending therethrough. Also, a supplemental gasket can be used in conjunction with the present invention cover plate for enhancing the seal against the adjacent automotive vehicle body panel. Moreover, the cover plate may have circular, ovular or other polygonal peripheral shapes. Various materials have been disclosed in an exemplary fashion, however, a variety of other materials may of course be employed. It is intended by the following claims to cover these and any other departures from the disclosed embodiments which fall within the true spirit of this invention.

The invention claimed is:

1. A cover plate for use in covering an automotive vehicle body panel having an opening therein defined by a first panel edge therearound with a hole adjacent thereto defined by a second and smaller panel edge therearound, said cover plate comprising:

a substantially flat base having an appearance face and a hidden face thereon bordered by a peripheral edge thereabout, said peripheral edge of said base having a tapered frame integral therewith along at least a majority thereof, said base further having a first portion and an overhanging portion centrally separated by a median portion therebetween;

a pair of somewhat flexible legs having a substantially L-shaped configuration thereto each being defined by a shortened member and an elongated member thereof, each of said shortened members having a distal end thereof affixed to said hidden face of said base thereto, each of said elongated members of said pair of legs having a distal end thereof extending beyond said peripheral edge of said base, a first predetermined portion of said elongated members adjacent to said shortened members being in offset relationship with said overhanging portion of said base so as to define cavities therewithin, said elongated members being angled in orientation toward a plane defined by said base with a second predetermined portion of said elongated members adjacent to said distal ends thereof being closest to said plane;

a wedge ramp having a triangular-shaped segment with a first side thereof being mounted upon said hidden face of said base, a hypotenuse of said wedge ramp intersecting said base near said first portion thereof, said first portion of said base being locationally displaced opposite from said pair of legs attached thereto;

a fastening post protruding from said first portion of said hidden face of said base in a direction substantially normal thereto;

an auxiliary fastener; and said cover plate covering said opening of said body panel by engagement of said first panel edge between said elongated members of said pair of legs and said overhanging portion of said base therebetween, said cover plate further attaching upon said opening of said body panel by insertion of said fastening post within said hole of said body panel such that said auxiliary fastener can be secured thereto, said wedge ramp locating said cover plate into a desired relationship with said opening such that said pair of legs properly engages said first panel edge thereof.

2. The cover plate of claim 1 wherein:

a circular aperture is formed within said base, said aperture is defined by a cylindrical boss extending from said hidden face thereof.

3. The cover plate of claim 2 further comprising:

a member passing through said circular aperture of said base.

4. The cover plate of claim 3 further comprising:

a grommet engagably interfacing with said aperture and said boss of said base, said grommet having at least one electrical conductor extending therethrough.

5. The cover plate of claim 1 wherein:

said tapered frame surrounding said base is angled outward from said hidden face thereof for supplying a preloaded interference fit against said body panel around said opening upon proper fastening thereto.

6. The cover plate of claim 1 wherein:

said fastening post is an insert molded screw having a head located proximate with said appearance face of said base and having a threaded portion protruding through said base and from said hidden face thereof; and said auxiliary fastening device is a nut having internal threads therein for enmeshed engagement with said threaded portion of said screw when said screw extends through said hole in said body panel thereof.

7. The cover plate of claim 1 wherein:

said wedge ramp is further comprised of a pair of symmetrical triangular segments each being constructed such that said intersection of said hypotenuse and said base are oriented toward said first portion thereof, a pair of second edge of each of said pair of triangular segments projects substantially normal from said hidden face of said base and said second edges are joined together by a transverse wall therebetween.

8. The cover plate of claim 1 wherein:

said fastening post is defined as an unthreaded cylindrical member; and said auxiliary fastening device is a metallic clip having a central orifice therein bordered by a plurality barbed elements thereabout for engagement with said fastening post when said fastening post extends through said hole in said body panel.

* * * * *